No. 78,227. PATENTED MAY 26, 1868.
W. MILLER, J. J. BECKER & A. SIMCOX.
PEG FLOAT.
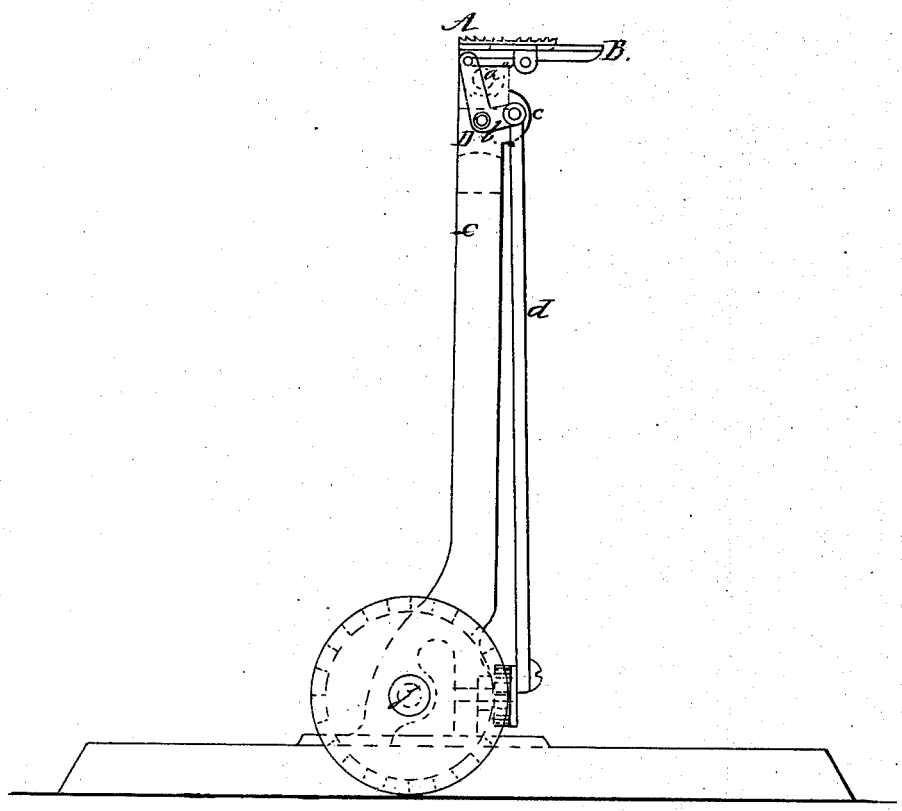

United States Patent Office.

WILLIAM MILLER, JOHN J. BECKER, AND ABRAHAM SIMCOX, OF FORT WAYNE, INDIANA, ASSIGNORS TO THEMSELVES AND JACOB MILLER, OF SAME PLACE.

Letters Patent No. 78,227, dated May 26, 1868; antedated May 15, 1868.

IMPROVEMENT IN PEG-FLOATS.

The Schedule referred to in these Letters Patent and making part of the same.

TO ALL WHOM IT MAY CONCERN:

Be it known that we, WILLIAM MILLER, JOHN J. BECKER, and ABRAHAM SIMCOX, of Fort Wayne, in the county of Allen, and State of Indiana, have invented certain new and useful Improvements in Peg-Floats; and we do hereby declare that the following is a full, clear, and exact description thereof, reference being had to the accompanying drawings, and to the letters of reference marked thereon.

In the drawings—

Figure 1 is a side elevation.

The nature of our invention consists in constructing a peg-float, to be operated by means of a series of mechanical devices, which serve to give to the cutters a reciprocating motion, and also allow of its adjustment to any desired angle that may facilitate the operation of cutting the pegs.

To enable others skilled in the arts to make and use our invention, we will proceed to describe its construction and operation.

A represents a set of cutters, which are so arranged as to cut in either direction. These cutters are secured in suitable ways, B, so as to be allowed to reciprocate freely. These ways are secured by means of a pivot, $a$, to the standard C, or upright of the machine, so as to move freely for the purpose of increasing the angle of elevation, or decrease it, as desired.

$b$ represents a pin, which is inserted into the standard, and acts as a stop or catch, to prevent the further movement of the ways.

D represents an elbow-lever, which is secured, by means of a pivot, to the standard, as seen in the drawings. This pivot acts as a fulcrum, on which said lever works. To the horizontal arm $c$ of this lever is attached a connecting-rod, $d$, which connects, at its lower end, with a crank-wheel, which, by its revolution, imparts to it a rotary motion. This crank-wheel may be drawn by hand or power, as desired. The perpendicular arm of elbow-lever D is connected, by means of a suitable link, to the under surface of the cutters.

The operation of our invention is as follows:

Rotary motion is imparted to the crank-wheel, which reciprocates the connecting-rod $d$, which imparts a rocking motion to the lever, and through the link to the cutters a reciprocating motion is transmitted, as will be readily seen and understood.

The advantages of this simple and effective device are, that the operator can do, in a factory, four or five times the amount of work in the same time, and do it better than by hand, from the fact that a high rate of speed is imparted to the cutters, and hence the pegs are cut off clean and instantly, with a comparatively dull edge, while, where the work is done by hand, with the best conceivable instrument, the pegs are only turned down, and are worn off by the slower movements of the operator. This advantage is one of great importance to the manufacturer of boots and shoes, not only insuring greater rapidity of work, but much less labor to the operator, and a greater perfection of work.

What we claim as new, and desire to secure by Letters Patent, is—

The elbow-lever D and connecting-link $d$, in combination with the reciprocating cutter A and guides B, the whole being constructed and operated in the manner and for the purposes specified.

WILLIAM MILLER. [L. S.]
JOHN J. BECKER. [L. S.]
ABM. SIMCOX. [L. S.]

Witnesses:
H. F. MILLSON,
GEO. ESMOND.